Figures 1, 2, 3:
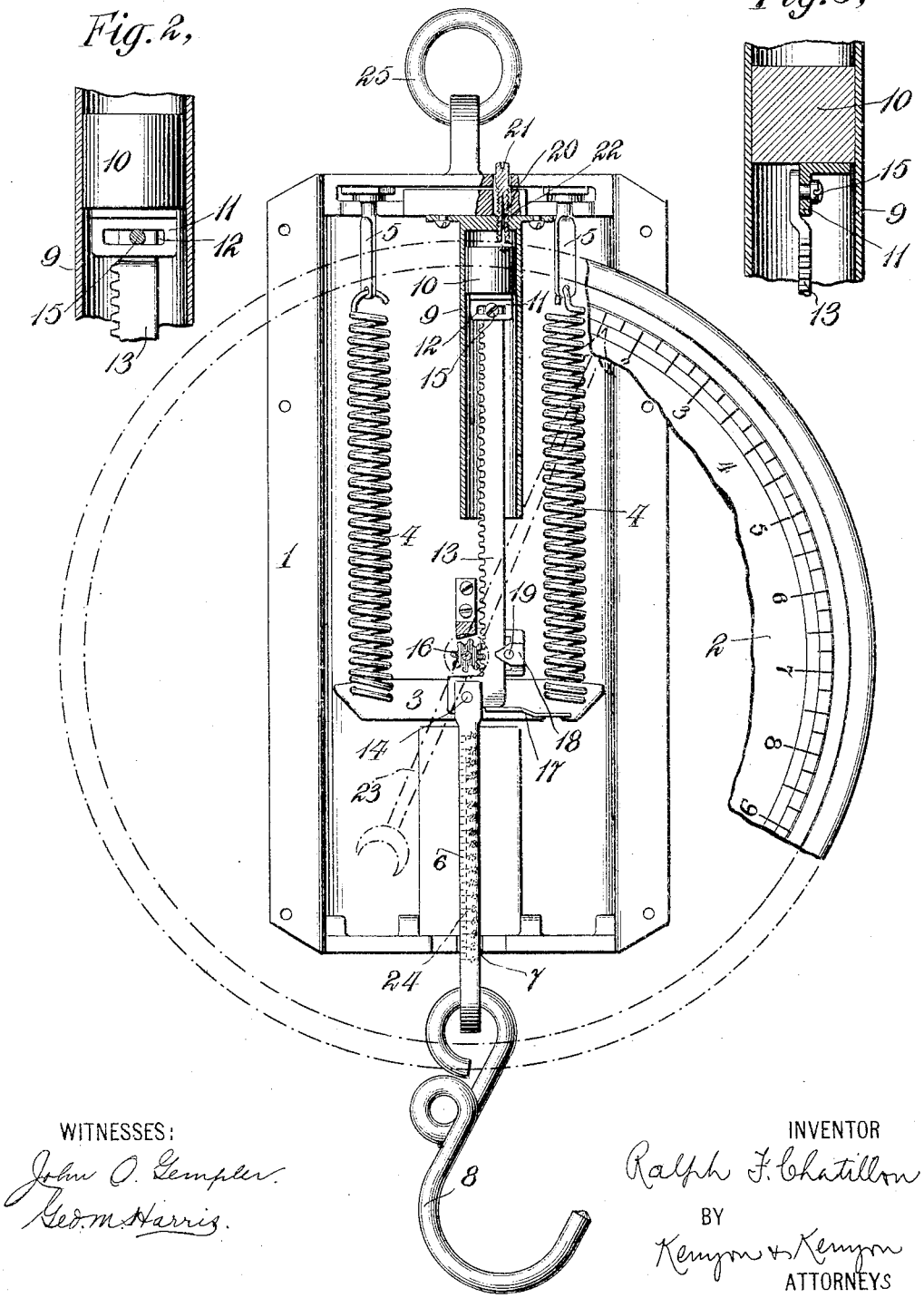

No. 776,725. PATENTED DEC. 6, 1904.
R. F. CHATILLON.
SPRING SCALE.
APPLICATION FILED FEB. 13, 1904.
NO MODEL.

WITNESSES:
John O. Gempler
Geo. M. Harris

INVENTOR
Ralph F. Chatillon
BY
Kenyon & Kenyon
ATTORNEYS

No. 776,725.                                                  Patented December 6, 1904.

UNITED STATES PATENT OFFICE.

RALPH F. CHATILLON, OF NEW YORK, N. Y.

SPRING-SCALE.

SPECIFICATION forming part of Letters Patent No. 776,725, dated December 6, 1904.

Application filed February 13, 1904. Serial No. 193,416. (No model.)

*To all whom it may concern:*

Be it known that I, RALPH F. CHATILLON, a citizen of the United States, and a resident of the city, county, and State of New York, have invented certain new and useful Improvements in Spring-Scales, of which the following is a specification.

My invention relates to spring-scales; and it has for its principal object to prevent the vibration of that portion of the mechanism which indicates the weight of any article being weighed, no matter how said article is supported by the receiver of the same, and to do this without impairing the accuracy of the scale-measurements.

When certain articles, such as pieces of meat, are dropped upon the receiving-pan of a spring-scale, the runner of the scale will drop and then vibrate up and down for some time unless some additional means are used to prevent such vibration. If the indicating-marks be on the runner by reason of such vibration, it will be impossible to tell immediately the exact weight of the article being weighed, as the runner will not immediately come to rest. Also if the indicator for the scale be a hand to be rotated by means of a pinion secured to said hand and a rack engaging with the pinion and attached to the runner there will also be a vibration of the hand back and forth on the dial of the scale unless some additional means be used to prevent such vibration.

My invention consists generally of means to prevent the vibration or fluctuating movements of the indicating part of the scale during the process of weighing articles by the scale without impairing its weighing efficiency or accuracy; and my invention also consists in the apparatus, features, and details of the same, as hereinafter shown and described.

Figure 1 illustrates one embodiment of my invention as applied to an ordinary spring-scale with the dial partly broken away and with the "damping" device or upper part of the features illustrating my invention shown partly in vertical section. Figs. 2 and 3 are details, greatly enlarged in vertical section, of the upper part of the damping device as shown in Fig. 1.

Similar numbers represent like parts in all the figures.

1 represents the casing of the scale that incloses the operating mechanism of the same, and 2 is the indicating-dial that covers the front of the casing 1.

3 is a cross-bar suspended to the lower ends of the two springs 4, which are secured by hangers 5 to the upper portion of the casing.

6 is the runner or draft-bar, connected with the cross-bar 3 and passing loosely through an opening 7 in the bottom of the casing 1.

8 is the hook to which the pan of the scale is to be hung and which hook has free play in two directions on the lower end of the runner 6.

9 is a cylinder secured to the upper end of casing 1 and having its walls and axis on lines parallel with the normal sliding movement of the runner 6. The lower end of the cylinder 9, or that end nearest the runner 6, is open, and a piston 10 is inclosed in said cylinder and is provided at its bottom with an extension 11, having a slot 12 extending in a direction transversely to the cylinder. A rack or bar 13 is loosely connected at its lower end with the runner 6 and preferably, as shown in Fig. 1, by means of a transverse pivot 14. The upper end of the rack or bar 13 is provided with a transversely-extending pin 15, which passes loosely through the slot 12, so as to permit the upper end of the bar 13 to move laterally in relation to the piston 10.

16 is the pinion, which is secured to the stud in the casing 1 and with which the rack or bar 13 engages. A spring 17 is secured to the cross-bar 3 and bears upon the shoulder at the lower end of bar 13 and keeps said bar 13 in a vertical position and in light and yielding engagement with the pinion 16.

18 is a finger extending over the front of bar 13, and 19 is a pin extending from said finger backward and outside of the bar 13, said finger and pin serving as guides for the side of the bar 13 opposite the pinion 16.

The upper end of the cylinder 9 is closed with the exception of the vent-hole 20, and the size of the vent is regulated by means of the screw 21, having a tapering longitudinal slot 22. The indicating-hand, which is secured to the pinion 16 and which indicates the weight upon the dial 2, is shown by the dotted lines 23 in Fig. 1.

The runner 6 may be provided with indicating-marks, as shown by dotted lines 24, which may be on the edge of said runner opposite to the dial 2, so that the weight of an article will be indicated by a mark registering with the lower edge of the casing 1. These indicating-marks can be used upon the same scale that has the dial 2, and the indicating-hand 23 or said dial and indicating-hand may be dispensed with and the indicating-marks 24 used instead.

25 is a ring loosely connected with the top of the casing 1, by which the scale may be suspended, and this ring 25 should be directly in line with the runner when it is in its normal position and with its normal movement.

The operation of my improved scale is as follows: If the scale be held in its proper position or suspended by the ring 25, the runner 6 will be vertical. If an article be dropped upon the receiver for the same, either on the hook 8 or upon the scale-pan suspended by said hook, the runner will be pulled down against the action of the springs 4, and the bar 13 will also be pulled down, and said bar will pull down the piston 10 in cylinder 9, the connection between said piston and bar caused by the pin 15 and slot 12 permitting a lateral play of the upper part of the bar 13 with relation to the piston, so that the movement of the bar 13 either up or down in the piston will be on a line or lines parallel with the axis of the cylinder, so that the piston will not bind against the walls of the cylinder and the movement of the piston 10 will be free. It will be seen that the walls of the piston serve as a parallel guide for the piston or block 10, which moves in said guide. The free movement of the block or piston, and consequently the free movement and guiding of the upper part of the bar 13, will prevent either the runner 6 or the hand 23 from fluctuating or vibrating back and forth after the runner has been pulled down by the weight of the article being weighed. It very often happens that an article, such as a piece of meat, is put or dropped upon the edge of the receiving-pan. This will cause the runner 6 to be drawn somewhat out of vertical position, and if the upper end of the bar 13 did not have a free lateral movement the piston 10 would bind against the walls of the cylinder in its movement, the scale would not be likely to register correctly, and vibration would be most likely to occur, both by the runner 6 and the hand 23, the vibration of the hand occuring by reason of the rack 13 binding or engaging tightly with the pinion 16 instead of loosely engaging with it, as it should do. The light engagement of the rack 13 with the pinion 16 is made by the spring 17, and this engagement is yielding owing to the yielding nature of the spring and the free lateral movement of the upper part of the rack 13, said spring being the principal means of keeping the rack in engagement with the pinion. In order to wholly and entirely prevent the vibrations and fluctuations of the indicator of the scale, the cylinder 9 is closed at its upper end, except for the vent, which construction provides an air-cushion for the upper movement of the piston 10.

Attempts have heretofore been made to prevent vibrations or oscillations of the hanger and indicating-hand of spring-scales by "damping;" but no previous construction has ever directly connected the sliding block or piston with the means for operating the indicating-hand. This construction in itself will either entirely prevent or reduce to a minimum the vibrations of the hanger or the indicating-hand, or both, without interfering in any way with the accuracy of the indications.

By my invention all vibration and fluctuation of the indicating device of the scale are thoroughly and entirely prevented, and the inaccuracy in indications heretofore always present whenever damping has been attempted is avoided.

I do not limit myself to the precise construction shown and described, as many changes other than those suggested may be made without departing from the principles of my invention or sacrificing its chief advantages.

What I claim as new, and desire to secure by Letters Patent, is—

1. In a spring-scale, the combination with the runner, a bar loosely connected with said runner, a guideway arranged between said runner and the top of the scale and on lines parallel with the line of normal movement of the runner, a block constructed and arranged to slide in said guideway, and means for connecting said block and bar to permit lateral movement of the bar, at said connection.

2. In a spring-scale, the combination with the runner, a bar loosely connected with said runner, a cylinder arranged between the runner and the top of the scale, and having its axis parallel with the line of normal movement of the runner, a piston inclosed in said cylinder, and means for connecting said piston and bar to permit lateral movement of the bar, at said connection.

3. In a spring-scale, the combination with the runner, a bar loosely connected with said runner, a cylinder arranged between the runner and the top of the scale, and having its axis parallel with the line of normal movement of the runner, and having its end nearest the runner open, a piston inclosed in said cylinder, and means for connecting said piston and bar to permit lateral movement of the bar, at said connection.

4. In a spring-scale, the combination with the runner, a bar loosely connected with said runner, a cylinder arranged between the runner and the top of the scale, and having its axis parallel with the line of normal movement of the runner, and having its end nearest the runner open, and a vent in its other end, a piston inclosed in said cylinder, and means for connecting said piston and bar to permit lateral movement of the bar at said connection.

5. In a spring-scale the combination with the runner, a bar loosely connected with said runner, a cylinder arranged between the runner and the top of the scale, and having its axis parallel with the line of normal movement of the runner, and having its end nearest the runner open, and a vent in its other end, and means for regulating the size of the vent-opening, a piston inclosed in said cylinder, and means for connecting said piston and bar to permit lateral movement of the bar, at said connection.

6. In a spring-scale, the combination with the pinion for operating the indicator, the rack for engaging with said pinion, a guideway arranged on parallel lines between said pinion and the top of the scale, a block constructed and arranged to slide in said guideway, means for connecting said block and rack to permit movement of the rack toward and away from the pinion, and means for keeping the rack lightly in engagement with the pinion.

7. In a spring-scale, the combination with the pinion for operating the indicator, the rack for engaging with said pinion, a guideway arranged on parallel lines between said pinion and the top of the scale, a block constructed and arranged to slide in said guideway, means for connecting said block and rack to permit movement of the rack toward and away from the pinion, and means for keeping the rack yieldingly in engagement with the pinion.

8. In a spring-scale, the combination with the pinion for operating the indicator, a runner, a rack for engaging with said pinion and loosely connected with said runner, a guideway arranged on parallel lines between said pinion and the top of the scale, a block constructed and arranged to slide in said guideway, means for connecting said block and rack to permit movement of the rack toward and away from the pinion, and means for keeping the rack lightly in engagement with the pinion.

9. In a spring-scale, the combination with the pinion for operating the indicator, a runner, a rack for engaging with said pinion and loosely connected with said runner, a guideway arranged on parallel lines between said pinion and the top of the scale, a block constructed and arranged to slide in said guideway, means for connecting said block and rack to permit movement of the rack toward and away from the pinion, and means for keeping the rack yieldingly in engagement with the pinion.

10. In a spring-scale, the combination with the pinion for operating the indicator, the rack for engaging with said pinion, a cylinder arranged between the pinion and the top of the scale and with its axis parallel with the line of normal movement of the rack, a piston inclosed in said cylinder, means for connecting said piston and rack to permit movement of the rack toward and away from the pinion, and means for keeping the rack lightly in engagement with the pinion.

11. In a spring-scale, the combination with the pinion for operating the indicator, the rack for engaging with said pinion, a cylinder arranged between the pinion and the top of the scale and with its axis parallel with the line of normal movement of the rack and having its end nearest the pinion open, a piston inclosed in said cylinder; means for connecting said piston and rack to permit movement of the rack toward and away from the pinion, and means for keeping the rack lightly in engagement with the pinion.

12. In a spring-scale, the combination with the pinion for operating the indicator, the rack for engaging with said pinion, a cylinder arranged between the pinion and the top of the scale and with its axis parallel with the line of normal movement of the rack and having its end nearest the pinion open, and a vent-hole at its other end, a piston inclosed in said cylinder, means for connecting said piston and rack to permit movement of the rack toward and away from the pinion, and means for keeping the rack lightly in engagement with the pinion.

13. In a spring-scale, the combination with the pinion for operating the indicator, the rack for engaging with said pinion, a cylinder arranged between the pinion and the top of the scale and with its axis parallel with the line of normal movement of the rack and having its end nearest the pinion open, and a vent-hole at its other end, and means for regulating the size of the vent-opening, a piston inclosed in said cylinder, means for connecting said piston and rack to permit movement of the rack toward and away from the pinion, and means for keeping the rack lightly in engagement with the pinion.

14. In a spring-scale, the combination with the indicator, the bar for operating the same, the runner connected with said bar, a guideway arranged on parallel lines with the line of normal movement of the runner, a block constructed and arranged to slide in said guideway, and said bar loosely connected directly to said block.

15. In a spring-scale, the combination with the indicator-pinion, the rack for operating the same, the runner connected with said rack, a guideway arranged on parallel lines with the line of normal movement of the runner, a block constructed and arranged to slide in said guideway, and said rack loosely connected directly to said block.

16. In a spring-scale, the combination with the indicator-pinion, the rack for operating the same, the runner connected with said rack, a cylinder having its axis parallel with the line of normal movement of the runner, a piston inclosed in said cylinder, and means for directly connecting said rack loosely with the piston.

In testimony whereof I have signed my name to this specification in the presence of two subscribing witnesses.

RALPH F. CHATILLON.

Witnesses:
    JOHN O. GEMPLER,
    EDWIN SEGER.